(No Model.)
A. R. CARTER & H. C. HUGHES.
MANUFACTURE OF STAINED GLASS FOR WINDOWS, &c.
No. 477,990. Patented June 28, 1892.
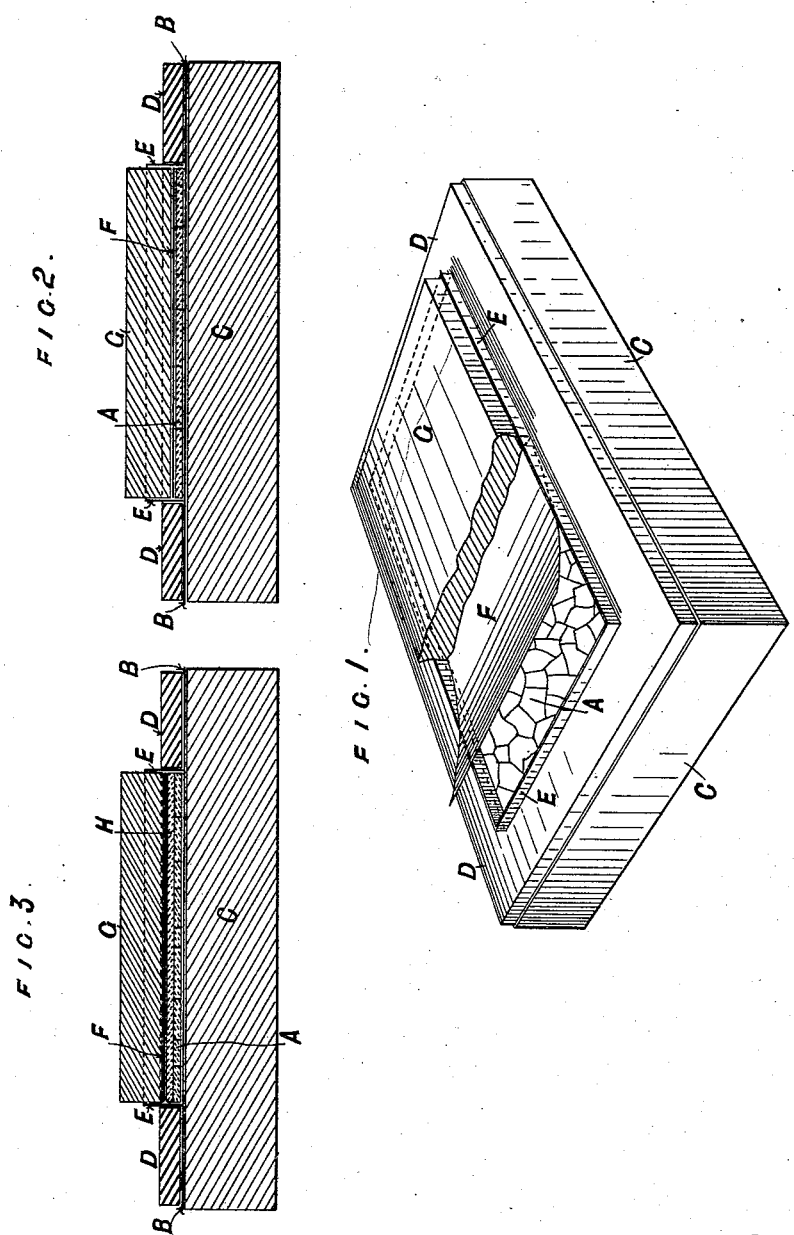
Witnesses:
C. Sedgwick
E. M. Clark
Inventors
A. R. Carter
H. C. Hughes
by Munn & Co.
Attorneys.

UNITED STATES PATENT OFFICE.

ARTHUR ROGER CARTER AND HENRY CLIFFORD HUGHES, OF LONDON, ENGLAND.

MANUFACTURE OF STAINED GLASS FOR WINDOWS, &c.

SPECIFICATION forming part of Letters Patent No. 477,990, dated June 28, 1892.

Application filed January 25, 1892. Serial No. 419,198. (No specimens.)

*To all whom it may concern:*

Be it known that we, ARTHUR ROGER CARTER, tobacco-manufacturer, of 4 Arthur Street, New Oxford Street, London, W. C., England, and HENRY CLIFFORD HUGHES, stained-glass manufacturer, of 15 Marlborough Road, St. John's Wood, London, N. W., England, have invented new and useful Improvements in the Manufacture of Stained Glass for Windows and other Transparencies and Mural Decorations, of which the following is a full, clear, and exact description.

Our improvements in the manufacture of multicolored stained-glass panels according to any given design for windows and other transparencies and for mural decoration have for their object to dispense with the usual leaden frames called "cames," in which the pieces of glass have heretofore been fixed; to protect from atmospheric effects the artistic work usually applied in enamel color on the surface of the stained glass; to cheapen the manufacture, and to enable smaller pieces of stained glass to be used, so as to permit of works of art being produced to a smaller scale or in greater artistic detail, but with less artistic labor than is possible when leaden cames are employed for fixing the glass.

In carrying the invention into effect the pieces of stained glass of different colors and shades are cut out of the proper size and shape to correspond to the "cut-line" cartoon in the usual way, except that they are made to fit together as accurately as possible without clearance, as when lead frames or cames are used. The pieces having been fitted together in the manner of a mosaic, are then united by welding together the abutting edges of the various pieces of glass by heat, with or without the intervention of a transparent vitreous flux, after which the glass mosaic is united by welding to a covering-sheet of white glass, to which or to the surface of the glass mosaic itself the artistic details, shading, and other work in vitreous enamel has first been applied, so that such artistic work will be imprisoned between the glass mosaic and the covering-sheet, and so will be effectually protected from atmospheric effects.

The invention will be described with reference to the accompanying drawings, which illustrate in Figures 1, 2, and 3 perspective and cross-sectional views of the means employed in carrying the process into practice.

The pieces of glass comprising the mosaic A are laid upon a sheet of platinum B, supported on an iron or fire-clay slab C, the glass mosaic being surrounded by a frame D, of fire-clay or other material having a lesser coefficient of expansion than glass, so as to insure the abutting edges of the pieces of glass being brought into intimate welding contact by the expansion of the glass with heat. Packing-pieces of iron or other metal having a higher coefficient of expansion than the frame may, if necessary, be inserted between the frame and the glass, so as to assist in compressing the pieces of glass together. Parting-strips E, of mica or platinum, are inserted between the outer edges of the glass mosaic A and the surrounding frame to prevent the adhesion of the glass to the frame. Upon the glass mosaic A another sheet of platinum F (shown partly raised in Fig. 1) is superimposed and sufficient pressure applied by a fire-clay or iron slab G to prevent the glass bulging upward. The stained-glass mosaic having been allowed to cool is then capable of being removed as a single sheet, which may be drawn upon and shaded by the artist with vitreous enamel color and afterward fired in the usual way, so that instead of the artist working upon isolated pieces separately, as usual, the whole colored sheet receives its artistic treatment at once, whereby much greater freedom for artistic effects, and consequently for breadth of treatment, combined with greater accuracy of detail, are obtained with less mechanical labor. To protect the enamel color, the stained-glass sheet is then united by welding to a sheet of plain white glass H, covering the whole of the artistically-treated surface of the stained glass, the operation of welding together the two superimposed sheets being performed with the aid of a vitreous flux and in an analogous manner to that above described for welding together the pieces of the mosaic. This, the second stage of the operation, is represented in Fig. 3; or the artistic treatment in vitreous enamel may be applied to the sheet of white glass instead of to the stained-glass mosaic, and after being fired the two may be superposed, the one upon the other, and united by welding, as before described.

For mural decoration the process would be the same, except that the stained glass would be of deeper or less transparent color than for windows.

The metal platinum is selected for contact with the glass by reason of its inoxidizability and the ease with which it may, when in the form of a thin sheet, be peeled off the welded glass sheet without injury to itself or to the surface of the glass.

The welding together of the component parts of the mosaic and of the mosaic to the covering sheet of glass is performed in an ordinary muffle heated to the temperature necessary for the purpose.

Having now particularly described and ascertained the nature of the said invention and in what manner the same is to be performed, we declare that what we claim is—

1. In the manufacture of stained-glass panels, the herein-described step which consists in juxtaposing and welding together by heat the contiguous edges of variously-colored pieces of glass, substantially in the manner specified.

2. In the manufacture of stained-glass panels, the herein-described step which consists in juxtaposing and welding together by heat the contiguous edges of variously-colored pieces of glass pressed between sheets of platinum and confined within a marginal frame, substantially in the manner specified.

3. The herein-described process of making stained-glass panels, which consists in juxtaposing and uniting by welding together by heat the contiguous edges of the elements of a stained-glass mosaic in the manner described and then welding to the said mosaic a covering-sheet of white glass, as described.

4. The herein-described process of making stained-glass panels, which consists in juxtaposing and uniting by welding together by heat the contiguous edges of the elements of a stained-glass mosaic in the manner described, then painting on the mosaic with vitrifiable enamel colors to give the artistic details of treatment and again firing to fix the colors, and then applying upon and welding by heat to the artistically-treated surface of the mosaic a covering-sheet of white glass, substantially as specified.

5. The herein-described process of making stained-glass panels, which consists in juxtaposing and uniting by welding together by heat the contiguous edges of the elements of a stained-glass mosaic in the manner described, and then welding to the said mosaic a covering-sheet of white glass, upon which the artistic details of treatment have been applied with enamel colors and fixed by firing, so that the artistically-treated surface shall be imprisoned between the two thicknesses of glass, substantially as described.

6. A stained-glass panel consisting in a mosaic composed of pieces of stained glass welded together and a single sheet of glass covering and welded to the whole mosaic and of an intermediate design executed in vitrifiable enamel color upon one of the juxtaposed surfaces and imprisoned between the glass mosaic and the covering-sheet of glass, substantially as specified.

ARTHUR ROGER CARTER.
HENRY CLIFFORD HUGHES.

Witnesses:
 WM. CLARK,
 53 *Chancery Lane, London, W. C., Patent Agent.*
 F. W. KENNARD.
 53 *Chancery Lane, London, W. C., Clerk.*